United States Patent
Clark et al.

Patent Number: 6,075,753
Date of Patent: Jun. 13, 2000

[54] SYSTEM FOR SIMULATION OF UNDERWATER EXPLOSION PRESSURE FIELDS

[75] Inventors: Joseph A. Clark, Arlington, Va.; Jane A. Young, Rockville, Md.; Joel B. Gaspin, Takoma Park, Md.; Paul M. Moore, Gaithersburg, Md.

[73] Assignee: The United States of America as represented by the Secretary of the Navy, Washington, D.C.

[21] Appl. No.: 09/306,385

[22] Filed: May 6, 1999

[51] Int. Cl.[7] .................. H04B 1/00; G09B 9/00
[52] U.S. Cl. .............................. 367/131; 434/10
[58] Field of Search .................... 367/13, 131, 153; 434/10

[56] References Cited

U.S. PATENT DOCUMENTS

| | | |
|---|---|---|
| 3,555,165 | 1/1971 | Ettenhofer et al. ................ 367/1 |
| 4,189,026 | 2/1980 | Elliot et al. . |
| 4,373,143 | 2/1983 | Lindberg .................... 367/155 |
| 4,495,809 | 1/1985 | Higginbotham et al. ........ 73/865.6 |
| 4,713,800 | 12/1987 | Russell . |
| 5,091,891 | 2/1992 | Thomas et al. . |
| 5,105,801 | 4/1992 | Cathignol et al. . |
| 5,195,508 | 3/1993 | Muller et al. . |
| 5,214,620 | 5/1993 | Rattner . |
| 5,229,977 | 7/1993 | Owen . |
| 5,430,691 | 7/1995 | Fridman . |

Primary Examiner—Ian J. Lobo
Attorney, Agent, or Firm—John Forrest; Jacob Shuster

[57] ABSTRACT

An array of piezoelectric transducers from which acoustical energy is emitted at a low and high frequency within a predetermined frequency band, synthesizes a localized underwater simulation of a remotely located explosion pressure field, by programmed computer control over the electrical energy input from a signal frequency generator transmitted through power transfer circuitry to the array of acoustic projecting transducers.

6 Claims, 4 Drawing Sheets

SYSTEM FOR SIMULATION OF UNDERWATER EXPLOSION PRESSURE FIELDS

The present invention relates in general to the generation of data simulating remotely located underwater explosion pressure fields.

BACKGROUND OF THE INVENTION

The generation of acoustic energy to produce underwater pressure fields is already known, involving the use of spark gaps between electrodes or use of an air gun in order to obtain pressure impulses singly or in rapid succession within a narrow band frequency spectrum. However, in connection with an underwater explosion, both its narrow frequency band signature and pressure time history changes with environmental conditions, location of the explosive charge and location of measurement so as to affect the pressure field to be simulated. The complexities of time history and frequency spectrum associated with underwater explosions are such that they cannot be matched by use of spark gap or air gun methods for explosive pressure field simulation purposes. Also, such known spark gap and air gun methods produce extraneous effects such as light flashes or bubbles which adversely affect simulation of explosion pressure fields in large volumes of seawater. It is therefore an important object of the present invention to provide apparatus and process to reproduce and record at some underwater location of interest an accurate simulation of remotely located explosion pressure fields useful for example in assessing potential damage to marine mammal hearing.

SUMMARY OF THE INVENTION

In accordance with the present invention, a projector array of acoustic energy transducers are positioned underwater at a location of interest for generating a simulated explosion pressure field in response to electrical power inputs from a generator at low and high frequencies selected under programmed control within a frequency band of 1–40 KHz for example. Such dual frequency electrical power inputs are transmitted through power transfer circuitry to the projector array and to a programmed computer through which voltage and current measurements of the electrical power inputs and acoustical energy measurements of the projector array outputs are performed. Calculation of electro-acoustic transfer functions from such measurements are subject to computational control based on analysis of the acoustical energy measurements. Such calculated transfer functions, as well as data editing influence of a storage file on time pressure history of underwater explosion, is utilized to effect selective operation of the power input generator in accordance with wave form data and impulse start commands produced by data processing of the storage file data. The acoustical energy output measurements are obtained from the transducers of the projector array through a hydrophone, subject to the aforesaid computer programmed control to provide simulation data with respect to an explosion pressure field for a relatively large volume of seawater at some remote location without extraneous effects such as bubbles and light. A more accurate basis for prediction of possible explosion pressure loadings at such remote location is thereby provided.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
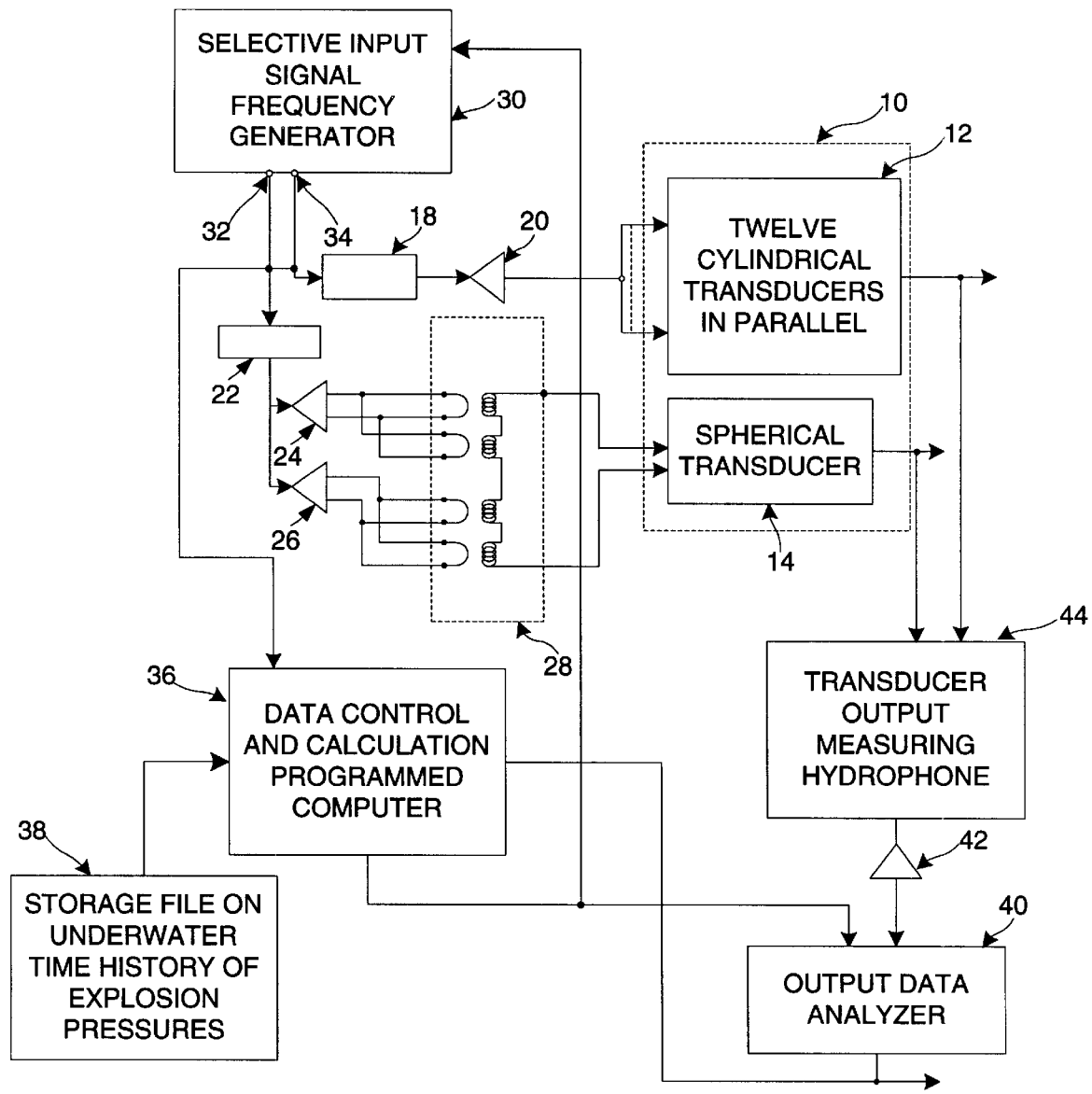
FIG. 1 is a block diagram and schematic circuit illustration of the system apparatus associated with the present invention.
Figure 2:
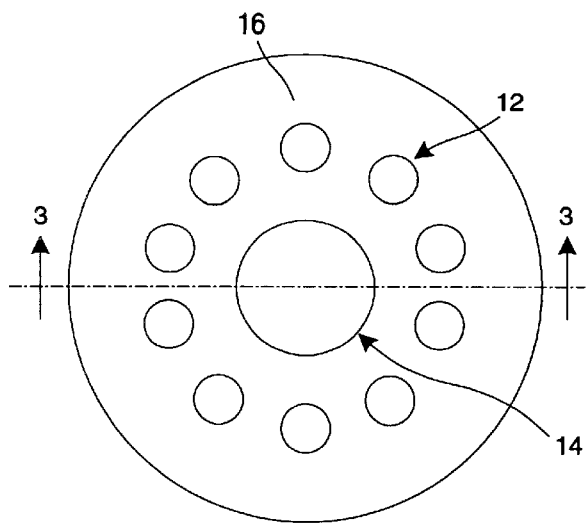
FIGS. 2 and 3 are top plan and side section views of the projector array diagrammed in FIG. 1.
Figure 3:
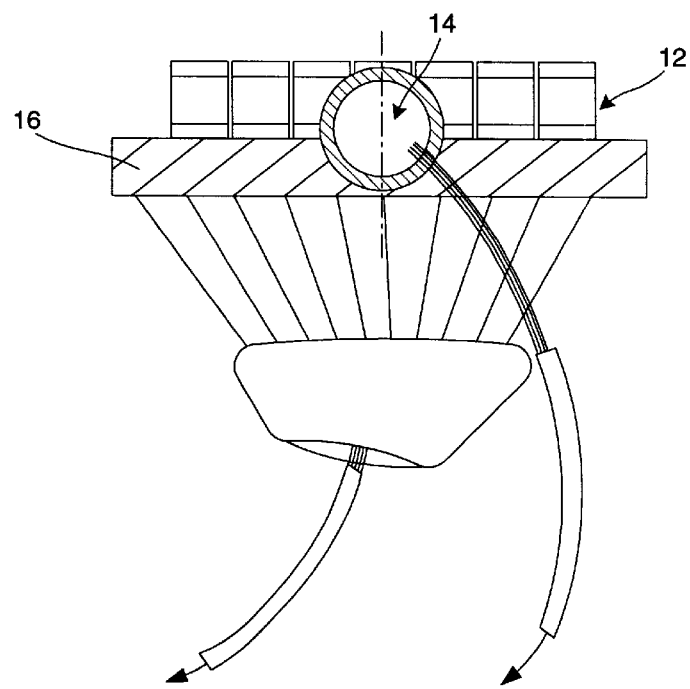

Referring now to the drawing in detail, FIG. 1 diagrams components of a system for simulating underwater explosions by generating an underwater pressure field at a location of interest a short distance from a piezoelectric projector array 10. In the illustrated embodiment, the projector array 10 consists of a plurality of commercially available cylindrical transducers 12 and a single spherical transducer 14 as diagrammed in FIG. 1. The cylindrical transducers 12 may be mounted on a circular backing plate 16 as shown in FIGS. 2 and 3, in surrounding relation to the spherical transducer 14.

With continued reference to FIG. 1, electrical power for operation of the piezoelectric transducers 12 and 14 is supplied thereto from a generator 30 through low and high frequency power transfer circuits. The low frequency circuit consists of a preamplifier 18 connected in series with a 6 K watt pulsed power amplifier 20 to the parallel connected cylindrical transducers 12. The high frequency circuit consists of a preamplifier 22 connected in parallel to a pair of 15 K watt pulsed power amplifiers 24 and 26, which are in turn connected to an impedance matching network 28 formed by four (4) transformers respectively having output windings connected in series to the single spherical transducer 14. The electrical power transmitted to the projector array 10 originates as an input at a low or high signal frequency within some divison of a frequency band from the generator 30 having a frequency range of interest, such as 1 KHz to 40 KHz. The electrical power is supplied from either a low frequency channel 34 or a high frequency channel 32 to the transducers 14 and 12. Such frequency signal inputs are also fed to a computer 36 through which programmed data control and calculations are performed. The programmed computer 36 also receives inputs from a storage file 38 on underwater time histories of explosion pressures and supplies output data to analyzer 40, such as a Hewlett Packard (HP) type 3120, receiving an input from the programmed computer 36 as diagrammed in FIG. 1. The data analyzer 40 also receives a signal input through a preamplifier 42 from a hydrophone 44 measuring the acoustic outputs of the projector transducers 12 and 14 in order to select matching frequency spectra for projector operation through the generator 30 and provide graphical representations of underwater explosion pressure variations as a function of time and acoustic frequency within a narrow range band simulating the calculated explosive pressure time history in a far field zone. Graphical reproductions of calculated and simulated explosion pressure characteristics are respectively shown by comparative graphs in FIGS. 5A and 5B, FIGS. 6A and 6B and in FIGS. 7A and 7B as hereinafter referred to.

Figure 4:
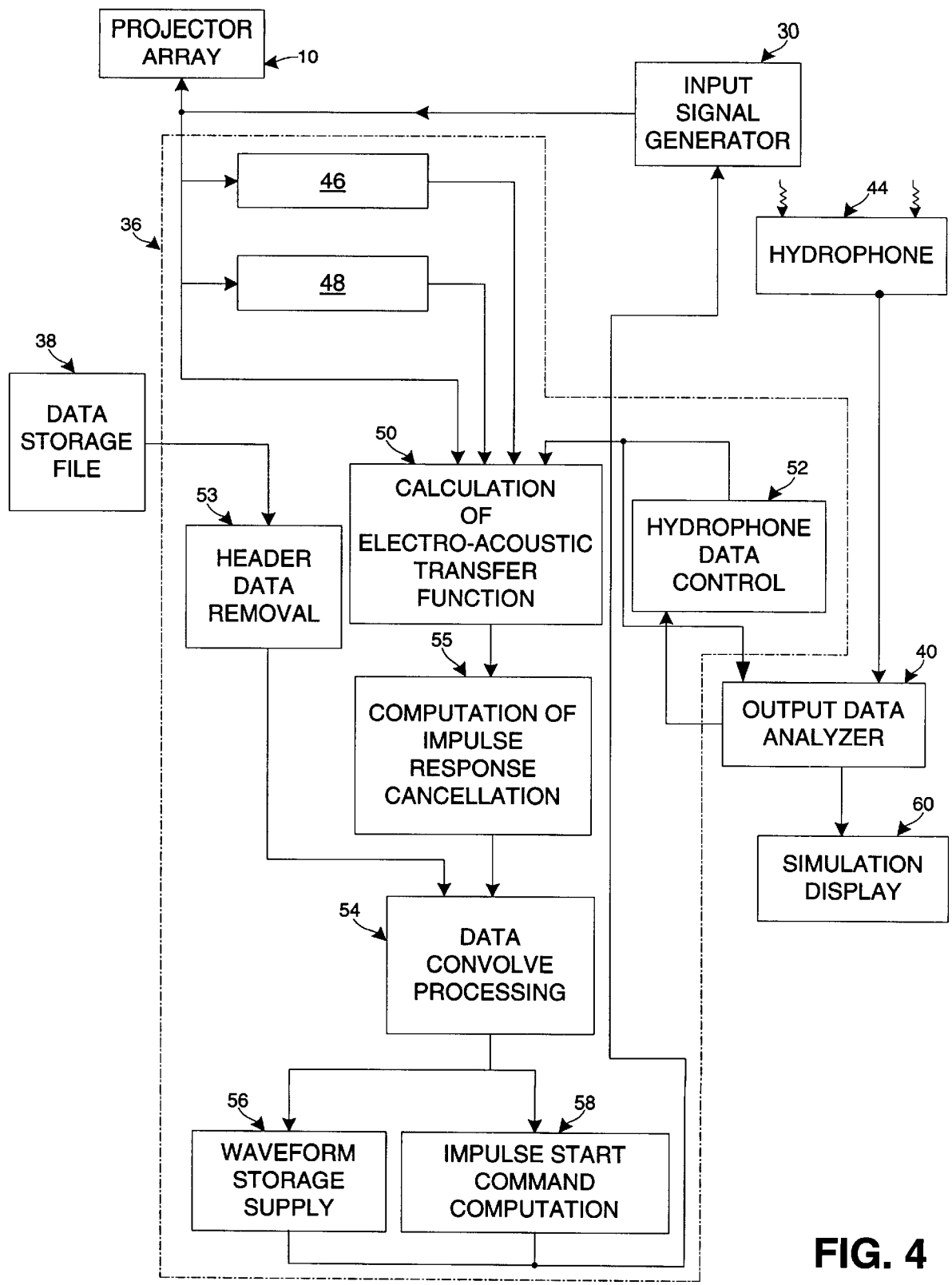
FIG. 4 is a block diagram of the data computational control and calculation program associated with the computer diagrammed in FIG. 1.
Figure 5A:
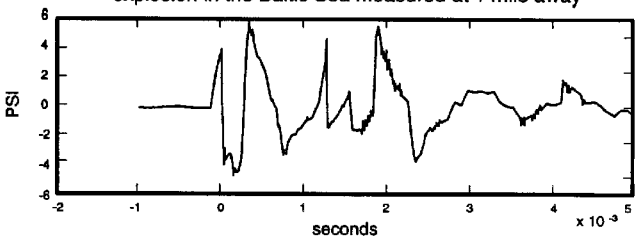
FIGS. 5A & 5B, 6A & 6B and 7A & B are comparative graphical data reproductions of actual explosion pressure fields at certain locations and the simulated explosion pressure fields corresponding thereto, produced in accordance with the present invention.
Figure 5B:
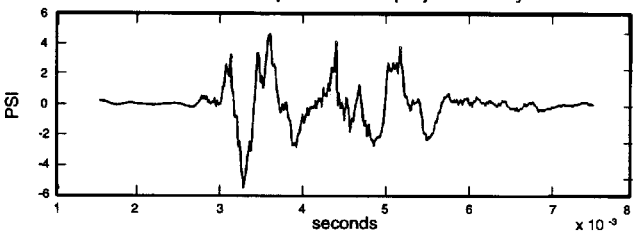
Figure 6A:
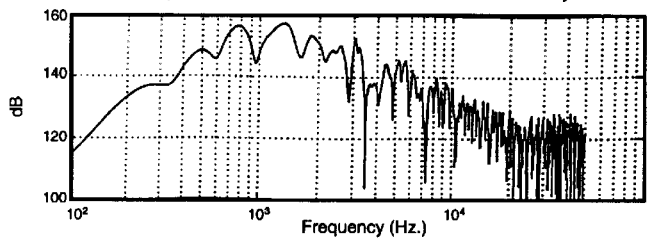
Figure 6B:
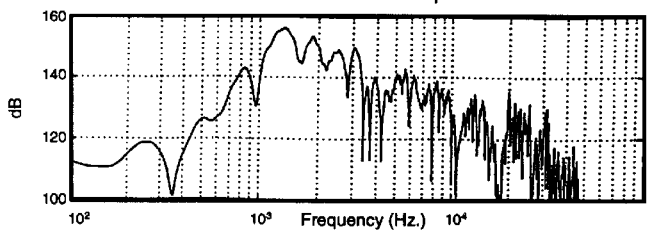
Figure 7A:
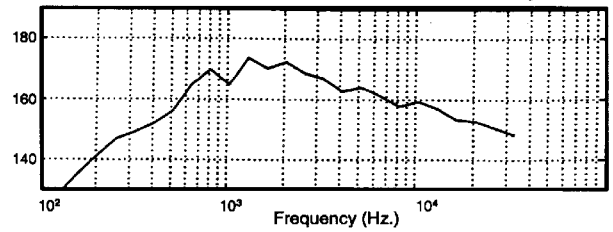
Figure 7B:
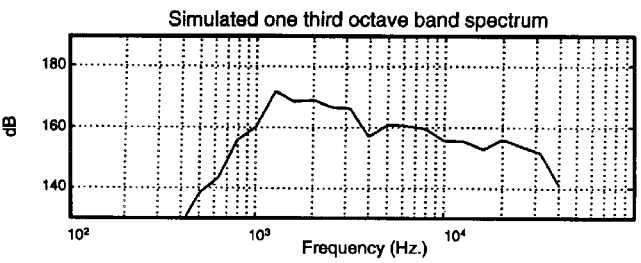

The program of computer 36 hereinbefore referred to in connection with FIG. 1, is outlined in FIG. 4. The low and high frequency signal inputs from the generator 30 undergo voltage measurement 46 and current amperage measurement 48, as diagrammed in FIG. 4, in a measurement stage of the program. The signal input is also fed to a calculation stage 50, receiving the data outputs of the electrical power measurements 46 and 48 as well as hydrophone response data from a data control stage 52 that is fed back to the output data analyzer 40 receiving acoustic energy measurement outputs from the hydrophone 44 as aforementioned. From the two generator frequency signals and the hydrophone response from data control 52 as inputs to the calculation stage 50, an electro-acoustic transfer function is determined to provide an output based thereon from the calculation stage 50, fed to a computational control stage 55 for determination of editing control data for cancellation of impulse response fed to a data processor 54 which also receives an output from stage 53 for removal of a header if present in the calculated pressure time history of underwater explosion from the data storage file 38 aforementioned. The output of the data processor 54 is fed to a storage supply 56 through which stored wave forms are supplied to the signal generator 30. Also, an impulse start command is produced in computation stage 58 for supply to the signal generator 30 to initiate a computational sequence as hereinbefore described, including set up of the data analyzer 40 for reception of hydrophone response through the data control 52 and retrieval of hydrophone pressure time history data stored in the analyzer 40. As a result of the foregoing described program as diagrammed in FIG. 4, a simulation display 60 of an underwater explosion pressure field is produced as an output of the analyzer 40, graphically depicted in FIG. 5B in terms of pressure measurements vs. time obtained through location of the piezoelectric projector array 10 one (1) meter away from the simulation pressure field. Such explosion pressure simulation graphically depicted in FIG. 5B corresponds to a calculated time history for a 110 pound underwater explosion in the Baltic sea through measurements taken 1 mile away therefrom, as graphically reproduced in FIG. 5A, demonstrating the similarity of simulated explosion pressure fields to remotely measured explosion pressure fields. Such comparative graphical reproductions of calculated and simulated explosion pressure field data as a function frequency, are shown in FIGS. 6A and 6B and in FIGS. 7A and 7B, to further demonstrate the similarity achieved between actual and simulated pressure fields by the programmed system of the present invention.

Obviously, other modifications and variations of the present invention may be possible in light of the foregoing teachings. It is therefore to be understood that within the scope of the appended claims the invention may be practiced otherwise than as specifically described.

What is claimed is:

1. In a system for simulation of an underwater explosion field at one location of interest from another location remote therefrom having a time history recorded in a storage file, including generation of electrical energy within a predetermined frequency band, the improvement residing in a method comprising the steps of:

projection of acoustical energy in response to said generation of the electrical energy from the one location of interest;

effecting underwater measurement of pressures induced by said projection of the acoustical energy; and programming control over said generation of the electrical energy in accordance with said underwater measurement of pressures and the recorded time history in the storage file to obtain said simulation of the explosion pressure field at the one location of interest.

2. In a system for simulation of an underwater explosion field at one location of interest from another location remote therefrom having a time history recorded in a storage file, including generation of electrical energy within a predetermined frequency band, the improvement residing in a method comprising the steps of:

projection of acoustical energy in response to said generation of the electrical energy from the one location of interest;

effecting underwater measurement of pressures induced by said projection of the acoustical energy; and programming control over said generation of the electrical energy in accordance with said underwater measurement of pressures and the recorded time history in the storage file to obtain said simulation of the explosion pressure field at the one location of interest, said step of programming control including:

measurement of the electrical energy;

calculation of electro-acoustic transfer function from said measurements of the pressures and the electrical energy; and editing data derived from said calculation of the electro-acoustic transfer function in accordance with the recorded time history from the storage file for controlling generation of the electrical energy and the projection of the acoustic energy resulting therefrom.

3. The system as defined in claim 2, wherein said generation of the electrical energy is limited to low and high frequencies within said predetermined frequency band.

4. In a system for simulation of an underwater explosion pressure field having a time history recorded in a storage file, including generation of electrical energy within a predetermined frequency band, the improvement residing in:

transducer means responsive to said generation of the electrical energy for projection of acoustical energy from a location of interest;

hydrophonic means for underwater measurement of pressures induced by said projection of the acoustical energy; and programmed computer means for controlling said generation of the electrical energy in accordance with said underwater measurement of pressures and the recorded time history in the storage file to obtain said simulation of the explosion pressure field at the location of interest.

5. The apparatus as defined in claim 4 wherein said transducer means includes a single projector from which the acoustical energy is emitted at a lower frequency within a division of said predetermined frequency band and a plurality of projectors, in surrounding relation to the single projector, from which the acoustical energy is emitted at a higher frequency within said division of the predetermined frequency band.

6. In a system for simulation of an underwater explosion pressure field having a time history recorded in a storage file, including generation of electrical energy within a predetermined frequency band, the improvement residing in:

transducer means responsive to said generation of the electrical energy for projection of acoustical energy from a location of interest;

hydrophonic means for underwater measurement of pressures induced by said projection of the acoustical energy; and programmed computer means for controlling said generation of the electrical energy in accordance with said underwater measurement of pressures and the recorded time history in the storage file to obtain said simulation of the explosion pressure field at the location of interest, said transducer means including a single projector from which the acoustical energy is emitted at a lower frequency within a division of said predetermined frequency band and a plurality of projectors, in surrounding relation to the single projector, from which the acoustical energy is emitted at a higher frequency within said division of the predetermined frequency band and said programmed computer means including computational means operatively connected to the transducer means and the hydrophonic means for calculation of an electro-acoustic transfer function from measurement of the electrical energy transmitted to the transducer means and the underwater measurement of pressures; and data processing means operatively connecting the computational means to the storage file and the hydrophonic means for editing the electro-acoustic transfer function from which operational control data is derived to effect said controlling of the generation of the electrical energy.

\* \* \* \* \*